(12) United States Patent
Shin (10) Patent No.: US 8,310,505 B2
(45) Date of Patent: Nov. 13, 2012

(54) METHOD FOR PLAYING DYNAMIC ENGLISH GRAPHICS OF ENGLISH SENTENCES FOR SPEED READING

(76) Inventor: Hyo Sang Shin, Seoul (KR)

( * ) Notice: Subject to any disclaimer, the term of this patent is extended or adjusted under 35 U.S.C. 154(b) by 0 days.

(21) Appl. No.: 13/322,515

(22) PCT Filed: Nov. 30, 2010

(86) PCT No.: PCT/KR2010/008503
§ 371 (c)(1),
(2), (4) Date: Nov. 25, 2011

(87) PCT Pub. No.: WO2011/071267
PCT Pub. Date: Jun. 16, 2011

(65) Prior Publication Data
US 2012/0113139 A1    May 10, 2012

(30) Foreign Application Priority Data
Dec. 9, 2009    (KR) ........................ 10-2009-0121688

(51) Int. Cl.
G09G 5/00    (2006.01)
(52) U.S. Cl. ............................................ 345/629; 704/1
(58) Field of Classification Search .................. None
See application file for complete search history.

(56) References Cited

FOREIGN PATENT DOCUMENTS

| | | |
|---|---|---|
| JP | 2002-207413 A | 7/2002 |
| JP | 2004-205770 A | 7/2004 |
| JP | 2005-338173 A | 12/2005 |
| JP | 2006-072281 A | 3/2006 |
| JP | 2006-202181 A | 8/2006 |
| KR | 1020010017480 A | 3/2001 |
| KR | 100686545 B1 | 2/2007 |
| KR | 1020090001718 A | 1/2009 |
| KR | 1020090096952 A | 9/2009 |

Primary Examiner — James A Thompson
Assistant Examiner — David H Chu
(74) Attorney, Agent, or Firm — Allen (Zhi Yang) Xue; Anova Law Group, PLLC (57) ABSTRACT

The present invention is characterized in that a computer recognizes inputted English sentences, divides the inputted English sentences into individual meaningful language elements and meaningful spaces surrounding the individual meaningful language elements, overlaps additional static graphics expressed as proper geometrical symbols suitable for the principles of merge, piping, and moving on original static data located in each region of the elements and the spaces, and outputs the overlapped graphic data or outputs new dynamic graphics including distinctive motion information which are designed to involve the principles of merge, piping, and moving by deforming the original static graphic data in the regions. The dynamic sentence data displayed on the screen is converted to a character graphic model having animated images for substantially expressing a semantic cohesion structure of a sentence therein according to Universal Grammar to intentionally stimulate the sense of sight and brain of a user.

11 Claims, 8 Drawing Sheets

FIG. 1

Word Element Catching (Merge)

Type1 Animating (Merge)

Type2 Animating (Merge)

FIG. 2

Word Element Catching (Piping)

Dog bites the chain loosed
Dog bites thieves run away
Dog's bite make thieves run away
Thieves are run away by the dog's bite Type 1 Animating (Piping)

Dog bites ~~the~~ chain ~~loosed~~
Dog ~~bites~~ thieves ~~run~~ away
Dog's bite ~~make~~ thieves ~~run~~ away
Thieves ~~are~~ ~~run~~ away ~~by~~ the dog's bite Type 2 Animating (Piping)

Dog bites the chain loosed
Dog bites the chain loosed
Dog bites the chain loosed
Dog bites thieves run away
Dog bites thieves run away
Dog bites thieves run away
Dog bites thieves run away
Dog bites thieves run away

FIG. 3

Word Element Catching (Merge & Piping)

2-merge, 2-piping, 1
Dog that bites the chain loosed get free
Mr. Dorsey was the director of a firm called Grunnings, which made drills.
2-merge, 2-piping, 1, 2-merge Type 1 Animating (Merge & Piping)

```
              100          200-1
Dogthatbites the chain loosed get free   200-2
Dog that bites the chain loosed get free
Dog that bites the chain loosed get free
Dog that bites the chain loosed get free
                                        200-3
            100-1
Mr. Dorseywasthe director of a firm called Grunnings, which made drills.
Mr. Dorsey was the director of a firm called Grunnings, which made drills.
Mr. Dorsey was the director of a firm called Grunnings, which made drills.
Mr. Dorsey was the director of a firm called Grunnings, which made drills.
Mr. Dorsey was the director of a firm called Grunnings,whichmade drills.
Mr. Dorsey was the director of a firm called Grunnings, which made drills.
                                                                  100-2
```

Type 2 Animating (Merge & Piping)

```
Dog thatbites the chain loosed get free
Dog that bites thechain loosed get free
Dog that bites the chain loosedget free
Dog that bites the chain loosed getfree 101-1     201-1    201-2   201-3
Mr. Dorsey  was thedirector of a firm called Grunnings, which made drills.
Mr. Dorsey was the director ofa firm called Grunnings, which made drills.
Mr. Dorsey was the director of afirmcalled Grunnings, which made drills.
Mr. Dorsey was the director of a firm calledGrunnings, which made drills.
Mr. Dorsey was the director of a firm called Grunnings, whichmade drills.
Mr. Dorsey was the director of a firm called Grunnings, which madedrills.
                          101-2                        201-4
```

FIG. 4

Word Element Catching (Moving with Merge & Piping 1.)

```
        1-merge              1-merge                    1-moving    2-piping
  They were the last people you'd expect to be involved in anything
  strange or mysterious because they just didn't hold with such nonsense.
                        2-piping              1-moving   origin
                                                         point
```

Type 1 Animating (Moving with Merge & Piping 1.)

300-1                                                               300-1

They were the last people you' d expect to be involved in anything strange or mysterious because they just didn' t hold with such nonsense.

They were the last people you' d expect to be invTheyolved in anything strange or mysterious because they just didn' t hold with such nonsense.

They were the last people you' d expect to be involved in ~~anything strange or mysterious~~ because they just didn' t hold with such nonsense.

They were the last people you' d expect to be involved in anything strange or mysterious ~~because they~~ just didn' t hold with such nonsense.

They were the last people you' d expect to be involved in anything strange or mysterious because they just didn' t hold They with such nonsense.
                             300-2               300-2

Type 2 Animating (Moving with Merge & Piping 1.)
                                                            301-1

They were the last people you' d expect to be involved in anything strange or mysterious because they just didn' t hold with such nonsense.

They were the last people you' d expect to be involved in anything strange or mysterious because they just didn' t hold with such nonsense.

They were the last people you' d expect to be involved in anything strange or mysterious because they just didn' t hold with such nonsense.

They were the last people you' d expect to be involved in anything strange or mysterious because they just didn' t hold with such nonsense.

They were the last people you' d expect to be involved in anything strange or mysterious because they just didn' t hold with such nonsense.
                                                            301-2

FIG. 5

Word Element Catching (Moving with Merge & Piping 2.)

The Dorsey's had a small son called Dudley and in their opinion there was, no finer boy anywhere.

Advanced Type 2 Animating (Moving with Merge & Piping)

The Dorsey's had a small son called Dudley and in their opinion there was, no finer boy anywhere.

The Dorsey's had a small son called Dudley and in their opinion there was, no finer boy anywhere.

→ The Dorsey's
The Dorsey's had a small son called Dudley and in their opinion there was, no finer boy anywhere.
→ a small son called Dudley
The Dorsey's had a small son called Dudley and in their opinion there was, no finer boy anywhere.

Word Element Catching (Moving with Merge & Piping 3.)

The few owls that managed to battle their way through the stormy sky to deliver mail had to be nursed back to health by Hagrid before they could fly off again.

Advanced Type 2 Animating (Moving with Merge & Piping)

The few owls managed to battle their way
*The few owls that managed to battle their way* through the stormy sky to deliver mail had to be nursed back to health by Hagrid
before they could fly off again.

The few owls that managed to battle their way
through the stormy sky to deliver mail had to be nursed back to health by Hagrid
before they could fly off again.

═══ The few owls ═══     ═══ The few owls ═══
The few owls that managed to battle their way through the stormy sky to deliver mail had to be nursed back to health by Hagrid
before they could fly off again.

═══ The few owls ═══     ═══ The few owls ═══
The few owls that managed to battle their way through the stormy sky to deliver mail had to be nursed back to health by Hagrid
before they could fly off again.

METHOD FOR PLAYING DYNAMIC ENGLISH GRAPHICS OF ENGLISH SENTENCES FOR SPEED READING

BACKGROUND OF THE INVENTION

The present invention disclosed herein relates to a scientific English teaching method, and more particularly, to a playing technology for intentionally stimulating the brain structure including the optical nerves, through changing English graphic patterns.

(Background 1.) Professor Noam Chomsky, the founder of Transformational-Generative Grammar, explains in his book on Universal Grammar, which pertains to cognitive grammar, that all grammar and sentences made from grammar are psychological products of the brain that can only be subject to the principle of 3-dimensional spatial cognition of the brain, and that this principle involves 3 major types of forces: merge (merging of divided content), piping (connecting related elements), and moving (interconnections between a subject and meanings associated with the subject).

That is, all sentences have a backbone or structure core in their sentence structures, and evolve or vary into diverse sentence patterns based on the 3 forces described above. Prof. Noam Chomsky has defined this into a single principle, a minimized technique of minimalism, a grammar through which sentences can be categorized into a 5 sentence structure pattern, a 28 sentence structure pattern, a 108 sentence structure pattern, and so forth.

(Background 2.) Due to advances in artificial intelligence design technology, language recognition programs and automated translation programs currently have the same extraction capabilities as humans, and surpass human ability in terms of high volume/high speed search, and have abstract concept cognition and assembling capabilities that are surpassing those of humans.

Automated translation tools provided by Google and other large websites are able to almost perfectly translate sentences that have been fragmented into segments, and can translate most sequential, specific, and frequently used sentences containing machine-stored meanings very smoothly.

While sentences that contain abstract meanings, are non-sequential and non-specific, and are not frequently used cannot be said to be completely machine translatable, this cannot be attributed to the problems of current translation programs, but rather, can be attributed to limitations associated with term databases employed by modern society search robots or translation robots and the developed state of artificial intelligence that learns from the same (often limitations that may be financial or administrative cause-related). For example, at present, even if a supplemental polishing task by a person is needed in order to achieve a proper translation in a certain field, if language data in the relevant field were to be additionally stored and learned, and an improved version of an automated translation machine is used, sentences that are complex and have technical content in the field could be readily and capably translated.

This reality attests to the exceptional potential of sentence recognition and translation programs that are realized by language databases and artificial intelligence referring to the same, which systematically categorize and store extremely diverse sentences extracted from the vast sea of languages found on the internet, and vast amounts of words and phrases discovered by scholars.

(Background 3.) Language processing tools such as word programs and animation graphics technology have developed at remarkable speed, due to the increase in computer storage/calculation capability and the processing speeds of display devices which display such programs. While in the past, most sentence processing programs have been restricted by storage capacity per character and expressing speed so as to convert and process character data in formulaic and rigid formats, recent word programs are showing their ability to demolish the barrier between characters and drawings. For example, various presentation-related file formats that use the animating gif file format or flash format, and macro functions are able to express characters as animated moving images through simple tools on even the everyday PC.

SUMMARY OF THE INVENTION

When reading text in a certain language, the brain mechanism for reading and interpreting the text of a person whose native language is that of the text, is different from the brain mechanism for reading and interpreting the text of a person to whom the text language is a foreign language and who must read the text while translating it into his/her native language.

Also, amongst those with the same native language, there are differences from person to person in the ability to read and interpret text in their native language at a fast pace. Even when taking into account differences between individuals, the difference in reading speed can be accredited to different brain mechanisms at work for reading and interpreting language expressed in sentences.

For a long time, many people from many different countries who were learning English as a second language have striven to acquire the skill of reading and interpreting English at equal or better levels of speed and accuracy than those who were born in English speaking countries and who used English as their native language. However, while those for whom English is a native language are able to amply perceive the structure of English sentences in three dimensions to understand the sentences, a person who has learned English as a second language is confined to a two-dimensional grammatical structural framework and is thus unable to escape from the constraints of having to disassemble an English sentence with the eyes and then reassemble the segments within the brain. It has therefore been difficult to achieve the same reading speed as a native language user, and even with a person that is able to read at a certain pace, after having read a long sentence, the person's memory is short-lived, resulting in an overall drop in comprehension.

The present invention provides a specified graphic tool capable of visually displaying language theory by re-interpreting the theory of abstract meanings as proposed by linguistics for Universal Grammar's 3 rules of merge (merging of divided content), piping (connecting related elements), and moving (interconnections between a subject and meanings associated with the subject), which have only been theorized thus far in the language learning field as described in (Background 1.), so as to allow learners to actually experience the same reading speed and brain function for understanding sentence structure as those employed by native users.

In order to actualize a sentence graphic model having a dynamic image by means of a computer-based display device for an operating structure for merge, piping, and moving of a certain sentence on a computer screen, and a method for actually driving the dynamic image, the present invention converts and stores a separate language element capable of moving using a sentence recognition program described in (Background 2) in the form of characters captured in a pre-determined sentence special region input in a computer, and uses a character animating tool described in (Background 3) for moving according to the merge, piping, moving principles of the separate language elements, to convert into dynamic sentence data through geometric flat symbols or physical 3D information.

The dynamic sentence data are output on a screen in the form of shapes and movements of each separate language element based on meaningful language elements in the predetermined sentence determined by a sentence perception unit, in other words, based on the sentence back bone determining the overall meaning of the sentence.

Here, the determining of merge, piping, and moving the remaining language elements including the meaningful language element or sentence back bone is basically left to the currently widely known automated translation system's sentence recognition ability.

For example, in the future, according to the advance of (automated translation) artificial intelligence, it may be determined to unfold a sentence through merging & piping or to unfold the sentence through merging & moving, etc. However, in any case, these are intrinsically preliminary steps for the technical idea of the present invention.

That is, the present invention is an invention pertaining to technology that contributes in reality to graphic effects on sentences recognized through the ability of artificial intelligence of the currently known computer, and the accuracy of its determining (actually, this point is debated amongst linguistic scholars) does not by itself infringe or take away from the dynamic graphic conversion concept of the present invention.

According to the present invention, an optimized training tool is provided for moving sentences according to the sentence reading principles of Universal Grammar, by quickly displaying sentences on-screen in a meaningful repetitive movement, to help a user whose native language is not English or one who is not proficient at reading English to follow the sentences with the eyes in order to employ the optical nerves and the brain connected thereto.

According to the graphic playing method of the present invention, when a suitable character input device and display device are connected to a computer having a language dictionary, a user may be provided with about 2000 pages of reading material in 10 weeks and a 300% average increase in reading speed and a 30% average increase in comprehension. This is an improvement of 3 times or more over traditional book-based speed reading training methods that employ direct reading and direct comprehension/sequential translation.

BRIEF DESCRIPTION OF THE DRAWINGS (Note) The drawings pertain to colored, dynamic graphics. Therefore, an accurate representation may not be provided, as the dimensions for this specification are a compressed black and white TIFF file which cannot reproduce color and gradation. Thus, for accurate drawings, refer to the drawings in present applicant's application for claim of priority in Korean Patent No. 10-0968364 (Application No. KR-2009-0121688).

FIG. 4 illustrates an embodiment of the present invention in which a sentence is interpreted with a suitable combination of merge and piping.

FIGS. 5 and 6 illustrate embodiments of the present invention in which a sentence is interpreted with the moving concept added to the merge and piping concepts.

*Explanation of reference numberals of main elements of the drawings

1; meaningful separate language elements, 1'; meaningless language elements
2; meaningful spaces, 2'; meaningless spaces
200, 300; overlapping static graphics conversion
100, 101, 201, 301; dynamic graphic conversion

DETAILED DESCRIPTION OF PREFERRED EMBODIMENTS

Hereinafter, a technical description of processing steps according to time within a computer will be provided with reference to FIG. 1.

First, a sentence recognition Step A is performed, which includes a Step A-1 of converting input sentences into spaces and separate language elements, and a Step A-2 of recognizing the converted spaces and separate language elements and comparing them to data in a language data storage unit to separate and store them into meaningful language element regions 1 and space regions 2 surrounding the element regions.

Next, a dynamic graphic conversion Step B is performed, which includes: a Step B-1 of matching sentence data derived through Step A, re-categorizing the data into the 3 types of main sentence assembly operations according to Universal Grammar, and allocating the resultant dynamic moving information to each language element region 1 and each space region 2; and a Step B-2 of inserting predetermined symbols for the allocated dynamic moving information into original static graphic information for each region to convert into new static graphic information to be displayed on-screen, or convert the static graphic information itself for each region into new dynamic graphic information to be displayed on-screen.

A sentence reference position moving Step C is performed, which includes: Step C-1 in which recognition information on the first sentence is deleted and dynamic graphic conversion is stopped when Steps A and B are completed for the first sentence, in order for Steps A and B to be continuously performed; and Step C-2 in which the reference points of the recognized region and an on-screen display region are moved to the head of the next sentence, in order to allow Steps A-1 through B-2 to be repeatedly performed on the next sentence or the sentence on the next line.

Thereafter, Steps A, B, and C are repeated while a sentence inputted in a computer is displayed across a screen and presented to a user as a page of a book. Then, unlike a typical computer book screen, the sentence assembly structure, in accordance with Universal Grammar, is displayed in an overlapped and dynamic (animated) manner, to allow a user to repetitively read the sentence to develop the user's viewing perspective that systematically seeks the separate language elements of the sentence and their combined structure.

When the above-described processes of the present invention are applied to a large number of short and long passages of text in a repetitive manner at increasing speed, a user's visual sense is stimulated to respond optimally so as to grasp the structure of an (English) sentence, so that the language interpreting structure of the user's brain gradually improves to a level similar to a user whose native language is (English).

In order to provide a more detailed description of the general technical characteristics of the present invention as described in FIG. 1, a more detailed description will be given below, with reference to an embodiment included in the drawing.

However, it should be noted that constitutive elements including specific technical terms and specific combinations of those elements described in the specific example below shall not be construed as limiting the intrinsic overall technical scope of the present invention.

To reintroduce the basic concept that pervades Prof. Chomsky's Universal Grammar, the intrinsic agent in a sentence is linked by a semantic chain, and when the agent disrupts the semantic chain, the waves are transmitted to the next agent, whereupon the next agent reacts in series.

Here, according to the minimum distance principle, the greater the distance, the force relayed by the semantic chain becomes weaker, and the effect on the agent becomes less.

For example, the concept of merge denotes that phrases that may become distant from one another are combined.

Figure 2:
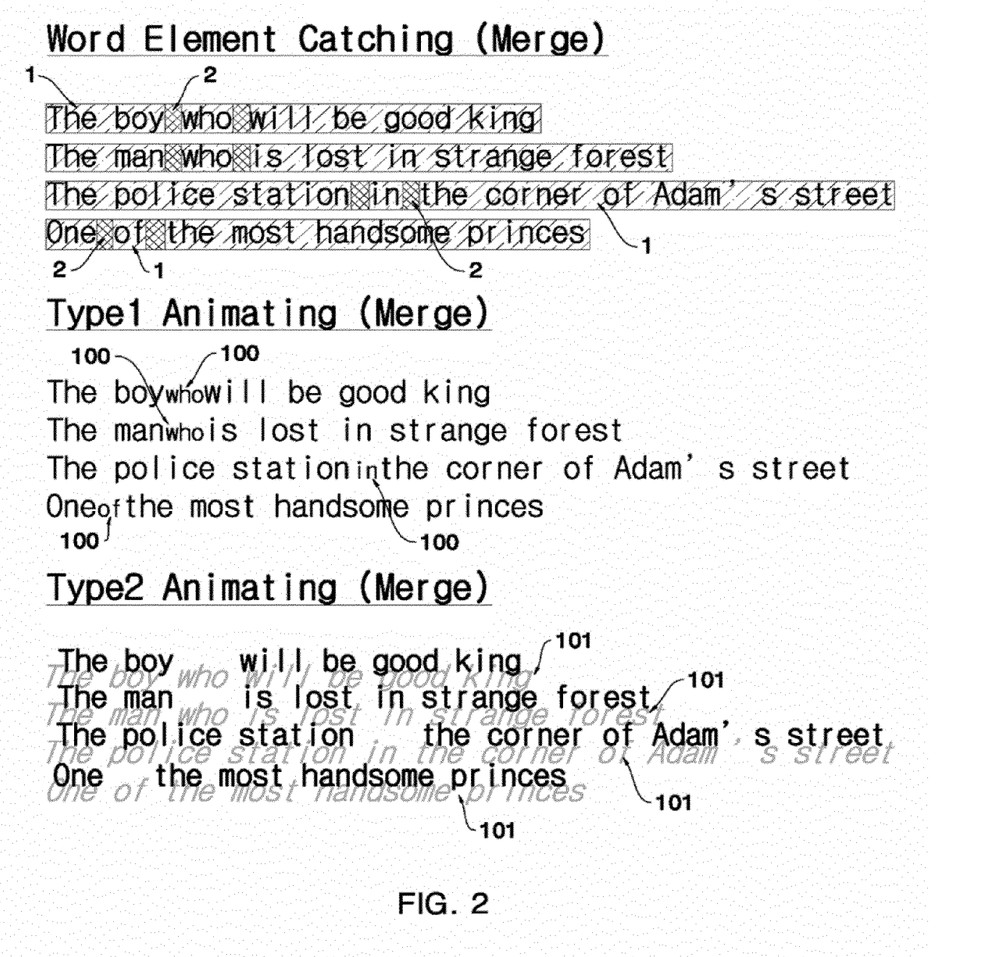
FIG. 2 illustrates an embodiment of the present invention in which a sentence is interpreted only with the merge concept.

FIG. 2 illustrates an embodiment in which the playing method of the present invention is applied to a sentence that is interpreted only with the merge concept. When examining the language element capture operation at the top of the figure, after a given sentence is recognized and interpreted by a sentence recognition processing unit, it is categorized into meaningful separate language elements 1 and meaningful spaces 2, and then the original static graphic information of each language element 1 and space 2 is stored in separate storages allocated for the respective regions. Here, static graphic information means nothing other than information on the content, size, and shape of characters displayed on a screen, the size and color of a background, etc.

From the first sentence, "The boy who will be good king", there are two separate language elements, "The boy" and "will be good king" that can be merged base on "who".

Here, in order to induce a sentence interpreting action in the brain according to the conceptual operation of merge, the language elements and spaces may be subjected to animating Type 1 in which the spaces disappear and the language element 100 (who) that induces merge is reduced in size and may be changed in color.

Also, as in Type 2, the original characters of the two merged language elements 101 may become lighter, and dynamic graphic conversion may be implemented such as new characters emerging, characters becoming closer, etc.

Figure 1:
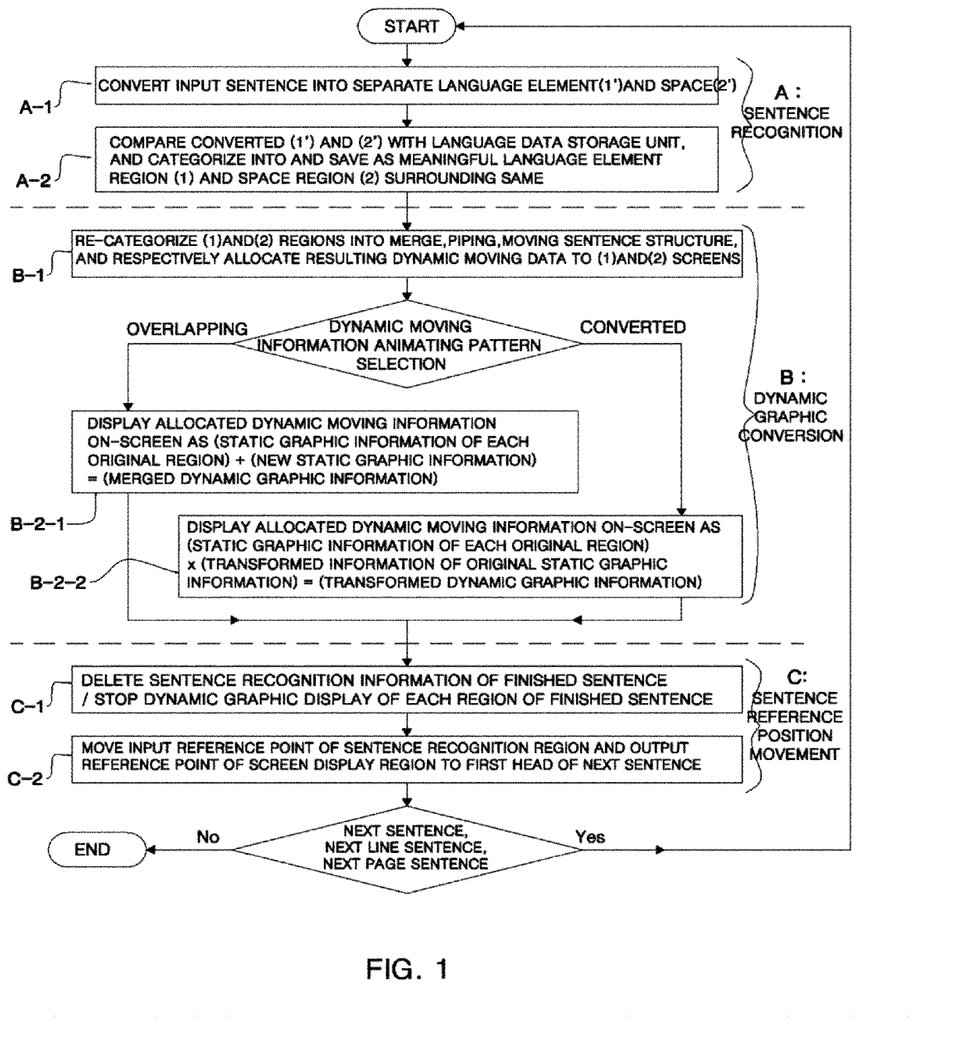
FIG. 1 is a flowchart illustrating each process of the dynamic English graphic reading method of the present invention.

The Type 1 and 2 processes in FIG. 2 correspond to Step B-2-2 in the flowchart of FIG. 1. That is, in order to faithfully reproduce the operating structure of merge, rather than overlapping static graphics conversion in B-2-1, dynamic graphic conversion in B-2-2 in which meaningful separate language elements 1 that emerge, shrink, or disappear, and then come closer together may be more effective.

Figure 3:
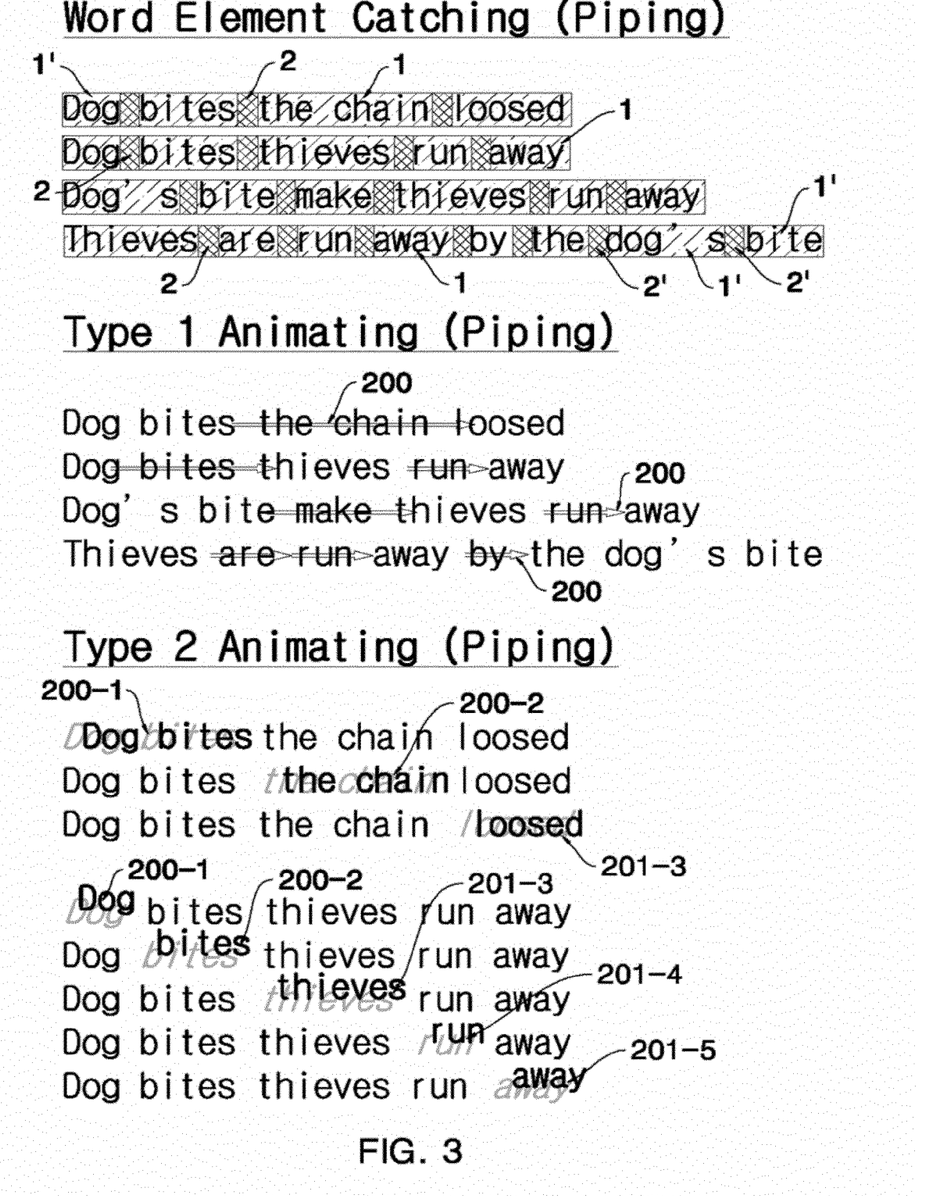
FIG. 3 illustrates an embodiment of the present invention in which a sentence is interpreted only with the piping concept.

FIG. 3 illustrates an embodiment of the present invention in which the playing method of the present invention is applied to a sentence that is interpreted only with the piping concept.

Piping is a concept that denotes connections made according to the flow of causal relationships, and can be interpreted as the illustration of sequential flow of energy.

Typical methods of analysis, combining, and interpreting by cutting and interpreting segments, etc. frequently involve a sentence interpreting structure that goes back and forth between the front and rear of a sentence, but proper interpretation involves sequentially proceeding from the start to the end of a sentence and occasionally, when required, dragging the meaning of the preceding sentence to a certain portion of the following sentence in a natural way. Therefore, sentences to which the piping concept is generally applied are effective in terms of training the brain to increase visual speed and taking the first meaningful subject of a sentence to the end of the sentence.

In the language element capture portion at the top of FIG. 3, meaningless language elements 1' and meaningless spaces 2', which have not been introduced in FIG. 2, are introduced.

Recent computer-aided automatic translation programs are storing an extremely large number of diverse sentences. Before artificial intelligence processes a certain sentence, there is a vast number of sentences that are referenced virtually in real time in dictionaries, wherein the meaningless language elements 1' and the meaningless spaces 2' are suitably cross-referenced with the dictionaries so that they can be filtered as meaningful separate language elements 1 and meaningful spaces that separate the elements 1. In particular, the standard for separating meaningful language elements/spaces from meaningless language elements/spaces is basically determined as similarities found by artificial intelligence between phrases referenced from dictionaries or sentences that are being input. Therefore, a language element that was meaningful in one sentence may be determined as meaningless in another sentence, which may also apply to the spaces around the language element. However, the above differences in artificial intelligence determination depart from the technical characteristic scope of the present invention, as described above in the Summary of the Invention. That is, the playing method of converted graphics tied to the dynamic graphic conversion of the present invention is the most effective visual and brain stimulation method that can be provided to a learner, in terms of a level of accuracy comparable to the levels of sentence recognition accuracy of modern automated sentence recognition technology, which displays a level of accuracy that can be industrialized.

Thus, before the present invention is applied to a learner, if a dictionary that is to be referenced by the artificial intelligence of a system were to be preemptively, suitably, and optimally set for the field to which a sentence to be input pertains, sentences with a higher similarity may be referenced more quickly and in greater numbers, so that a corresponding accurate sentence structure may be subjected to dynamic graphic conversion in order to provide playing effects to the learner. However, even if such preparatory work should be lacking, the effects of the playing method of the present invention or a played image will not be diminished in their intrinsic ability to purposefully and quickly stimulate the visual sense of a learner and the responsive structure of the brain that is linked to the visual sense.

For the Type 1 dynamic graphic conversion in FIG. 3, the arrow 200, indicating the causal connection that faithfully represents the basic concept of piping, shows a dynamic overlapping animating pattern showing overlapping of an original sentence. This is Step B-2-1 as described above. Specifically, dynamic moving information allocated to the language element regions 1 and the space regions 2 have had a predetermined symbol 200 (arrow) inserted in the original static graphic information of each region, so as to be transformed (overlapped) into new static graphic information to be displayed on-screen.

Let us additionally perform dynamic graphic conversion on the 2 sentences, "Dog bites the chain loosed" and Dog bites thieves run away" by means of Step B-2-2. These sentences have separate language elements that are all sequentially and causally connected with the meanings cut off for connections at the end of language elements. Therefore, as shown at the bottom of FIG. 3, an animating effect is shown in which the two sentences have their respective language elements emerging and being converted in shape and size, and at the same time, the following meaningful spaces are disappearing as if the front word is being pulled into collision with the rear word. Because the figure is not a moving screen, all sequential movement has been illustrated in order from top to bottom. However, on an actual computer screen, one sentence moves through Steps 201-1, 201-2 . . . 201-5, etc., to appear and disappear so that the words in one sentence appear to be alive and sequentially moving.

The slanted italicized characters that appear in the figures from FIG. 3 onward are actually characters that first existed, which have fading colors or become dim and disappear. The characters shown at the top or bottom of those characters are actually highlighted characters that newly appear, which have strong color or become vivid. This effect, as described above, can be clearly viewed as illustrated in the drawings for Korean Patent No. 10-0968364 (Application No. KR-2009-0121688), which claims right of priority to the present application.

FIG. 4 illustrates an embodiment in which the disclosed concepts of merge and piping in FIGS. 2 and 3 are suitably combined to show dynamic graphic conversion.

A computer determines the meaningful separate language elements in Step A of recognizing a sentence, and categorizes the spaces surrounding the language elements into merge spaces (2-merge) with another meaning or meaningful piping spaces (2-piping).

Then, according to the determined results, mutually different dynamic sentence data information is allocated, and this is applied in the original character form and played as a graphic pattern combination that is characteristic of the present invention as described with reference to FIGS. 2 and 3.

In the Type 1 animating for the first sentence of "Dog that bites the chain loosed get free.", "Dog" and "bite" initially pull each other, and then an arrow is depicted from "bite" to "free". That is, "Dog" and "bites" were merged together, and the words after "bite" were causally piped together.

Similarly, in the second sentence of "Mr. Dorsey was the director of a firm called Grunnings, which made drills.", the Type 1 animating initially pulls together "Mr. Dorsey" and "the director", and then an arrow is depicted from "of" through to "Grunnings", after which "Grunnings" and "made" are pulled together and an arrow is depicted until "drills". Specifically, "Mr. Dorsey" and "the director" and "Grunnings" and "made" were merged together, and the words in between were causally piped together.

For even faster visual processing or more dynamic sentence movement, Type 2 is disclosed. In Type 2 in FIG. 4 a diverse array of animating graphic forms such as emerging and prominent characters, words that collide with the rear words, light green in the positions occupied by existing words, or characters that become light yellow, are all basically created as converted image information that is scanned directly from the corresponding character regions, and not derived from character data. In other words, in Step B described above with reference to FIG. 1, the static graphic information of each region is used as the basis to transform the information itself into new dynamic graphic information to be displayed on-screen (in Step B-2).

FIG. 5 illustrates an embodiment in which dynamic graphic conversion is performed on a sentence to which the moving concept has been applied in combination with the merge and piping concepts.

Moving may be defined as a concept in which meanings connected to subjects are interconnected as if by a chain.

For example, in a long and complex sentence, when a subject or the subject of a meaning is far apart, the effect of memory remaining in the brain of a person reading that sentence will be less. This is why it is difficult for persons whose native language is not English to quickly grasp the sentence structure.

Therefore, when connections of meanings outside the range of merge are captured by a computer, moving may be applied at the same time as merge or before merge, and this may be subject to dynamic graphic conversion where it appears on screen as if an agent is walking over the sentence.

In the sentence, "They were the last people you'd expect to be involved in anything strange or mysterious because they just didn't hold with such nonsense" in FIG. 5, "They" (1-merge) may be merged with "the last people you'd expect to", or could affect "be involved in" with "moving". Similarly, the "They" could be semantically linked to "hold with" through "moving" because "hold with" is linked with "they" between the piping spaces depicted by 2-piping.

The Type 1 Animating (FIG. 5) shows a dynamic graphic sentence formed of relatively static graphic overlapping. As described above, each of five arranged sentences are shown in a playing state (still image) at a certain point in time. Specifically, if a screen on which a sentence is depicted is continuously animated, a dynamic graphic converted sentence video would be realized.

The merge and piping in the drawings follows the patterns described above, and moving replays meaning subjects that are far away through 300-1, 300-2, etc.

Type 2 Animating (FIG. 5) arranges still images at certain points of dynamic graphic converted regions (not static overlapped graphic) in sequence. For example, in the second and fifth sentences, the movement of "They" shows a connection that suggests that it slightly floats over the sentence as it moves. This graphic conversion pattern is an intrinsic characteristic of the present invention without which it is difficult to obtain a motive through Universal Grammar or any other type of language learning material, is capable of operating in the most optimal way through a computer-based display screen capable of animating using the method shown in FIG. 1, and may provide an optimized visual (brain) recognition training method that is more stimulating and purposeful than any other English learning text in order to provide an experience equal to that of an English native reader.

Figure 6:
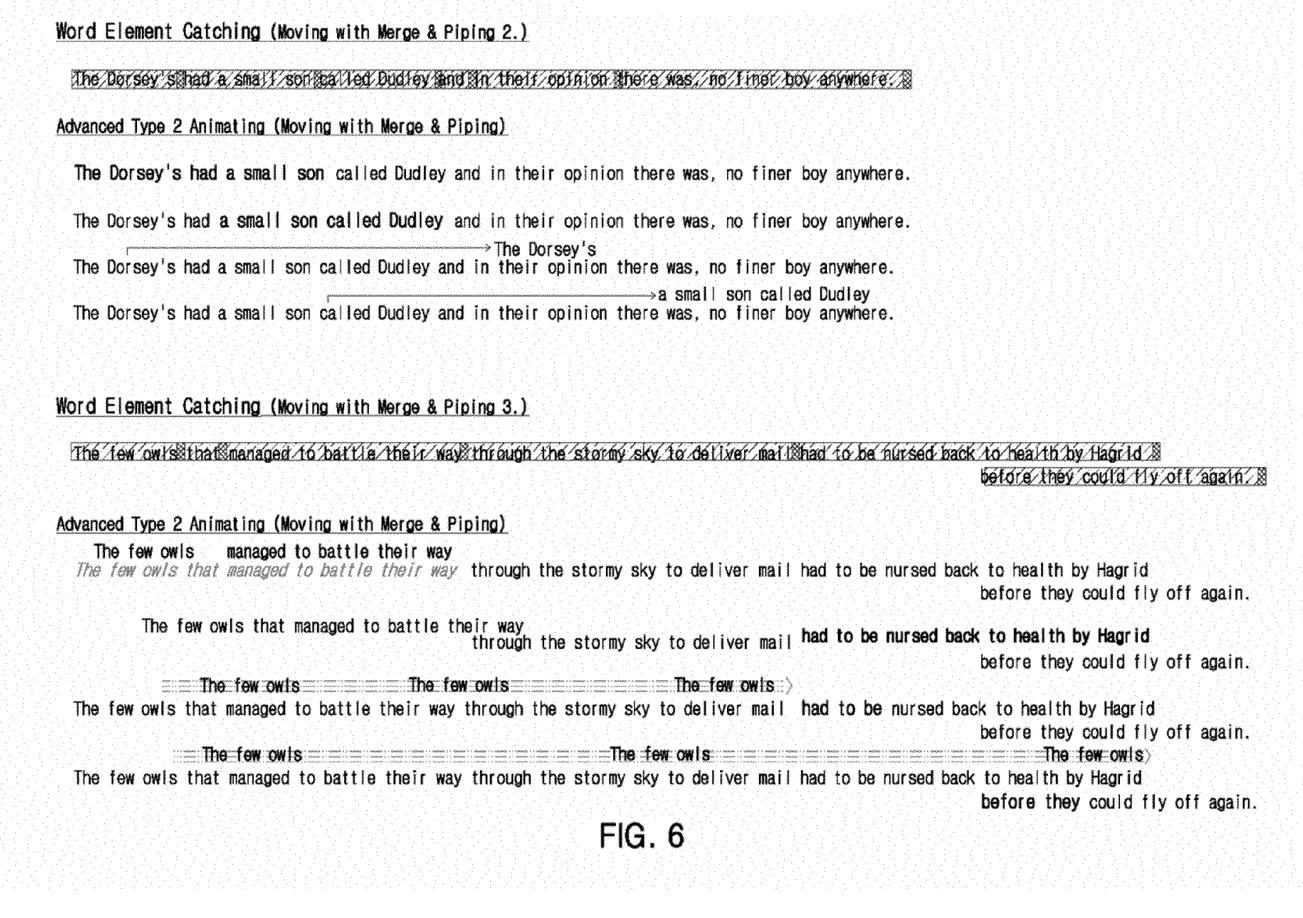

FIG. 6 illustrates an embodiment of a dynamic graphic image for advanced learners to perceive language elements in phrase units required for speed reading and for visual sentence structure analysis.

Referring to the two sentences illustrated in FIG. 6, an advanced sentence recognition program, unlike in FIGS. 2 through 5, recognizes a sentence, having a separate meaning and composed of 3-6 words or more, as a separate language element. The dynamic graphic conversion program eliminates all other character colors and symbols that can impede an increase in speed, and uses simple reading and pulling together, continuous movement of subjects, etc. to perform fast animation and teach a learner the ability for fast recognition, sentence deconstruction and reassembly skills.

Figure 7:
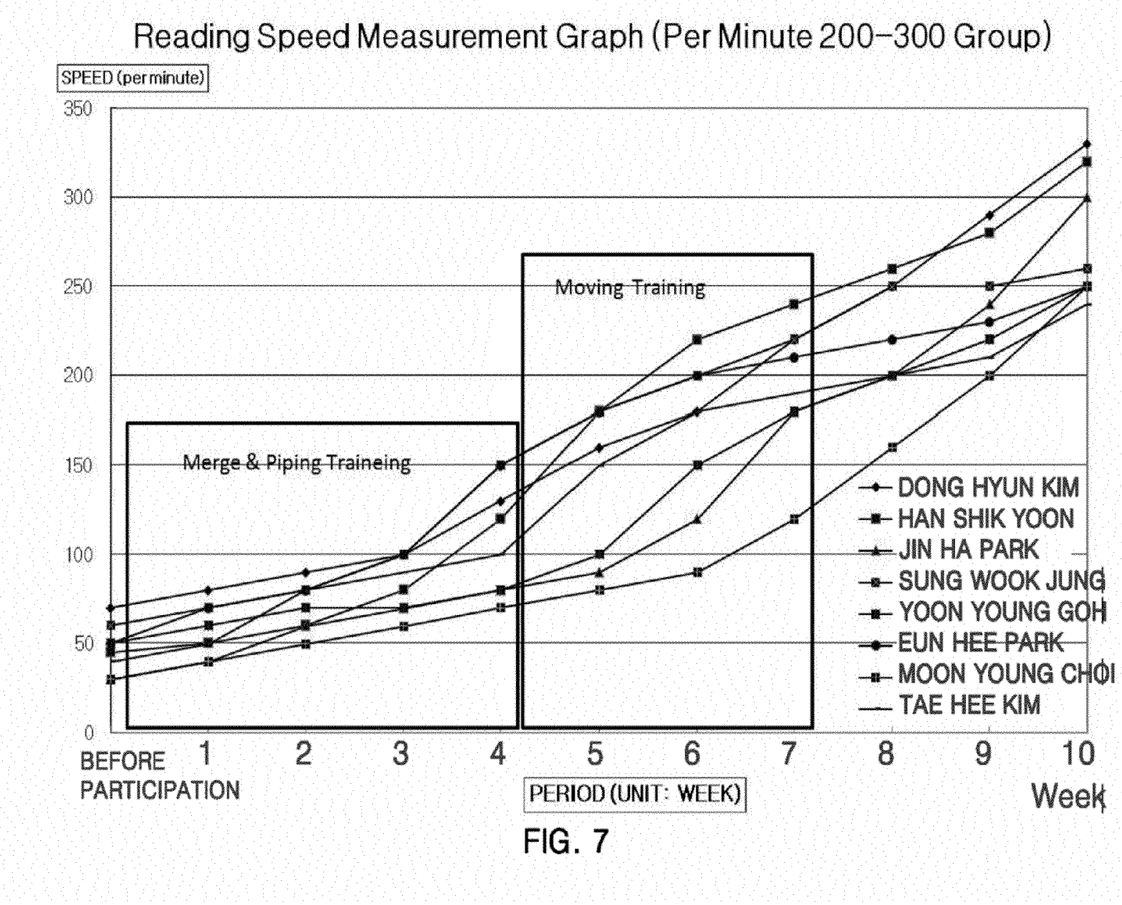
FIGS. 7 and 8 are graphs measuring academic achievement after a certain duration in which the playing method of the present invention was applied to test subjects.
Figure 8:
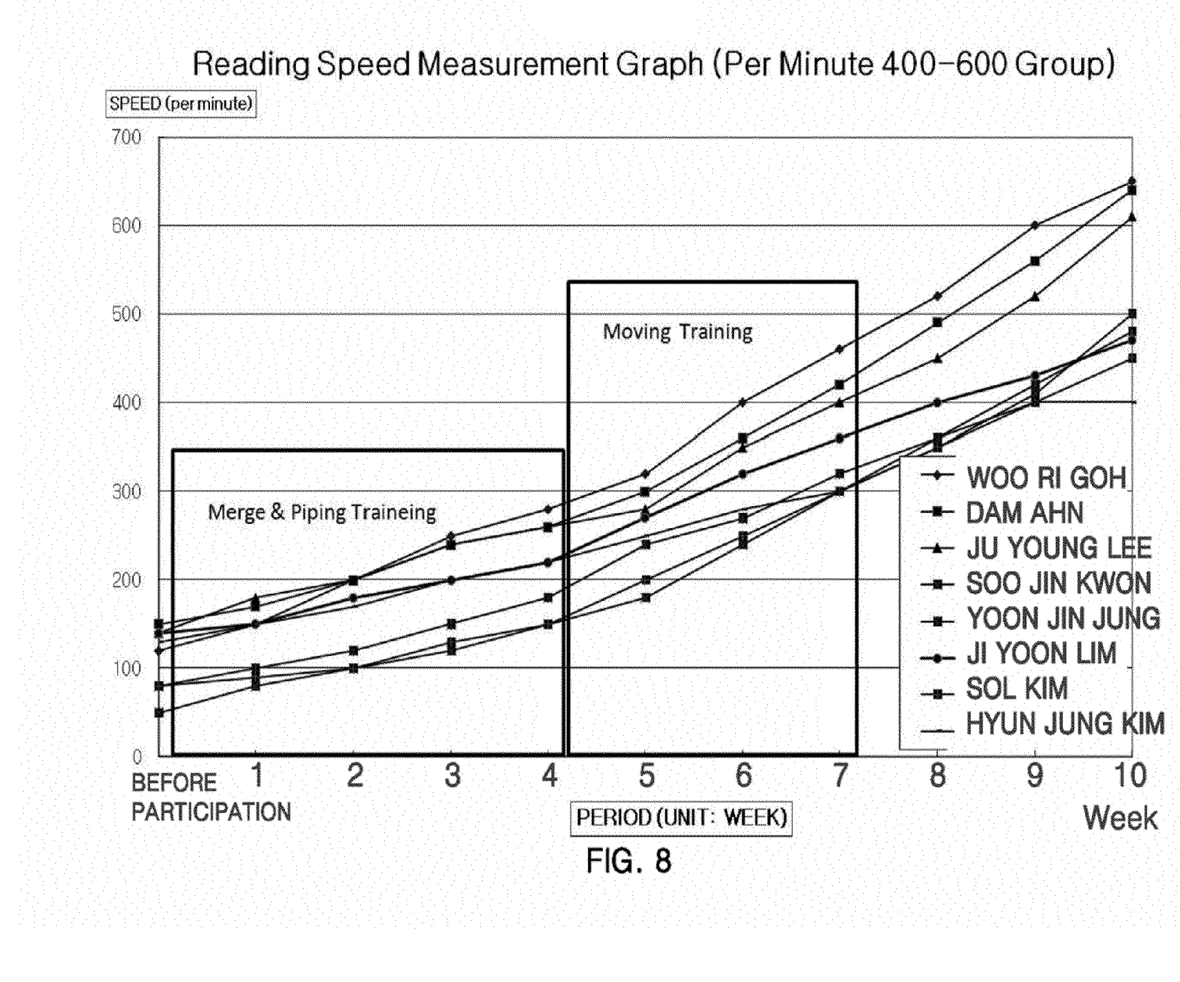

The above-described dynamic graphic image was sequentially provided to learners to measure learning ability, which is shown through graphs in FIGS. 7 and 8. Referring to the graphs, there is only a difference in initial ability due to the individuals' different levels of ability. After undergoing merge and piping training and being immersed in moving training, most of the learners showed a rapid increase in reading speed without any periods of non-progress. This was an achievement not possible with conventional individual-based methods, and was accomplished in a short period (within 7 weeks), in which the learners displayed the ability of a graduate school student whose native language is English, with a 200 to 400 word per minute reading rate (1 page or more per minute). Thus, this accurately illustrates the ability of the present playing method to optimally stimulate the brains of people from non-English speaking countries.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The dynamic English graphic playing method according to the present invention may be distributed over an internet network en masse, and can thus be used as a powerful speed reading animating learning tool for learners in non-English speaking countries around the world through computers.

While the present invention can induce ample and accurate brain stimulation even under present circumstances in which automated translation artificial intelligence is not yet completely capable, it will enable sophisticated and optimized brain training once patterns are additionally generated for dictionaries and set dynamic sentence data is revised and supplemented by humans. This may develop into a new English learning business model.

When considering future computer-loaded language dictionaries arising from huge increases in storage capacity, and rapid development of artificial intelligence that references such dictionaries in more sophisticated ways due to the accumulation of experience, patterns selected according to user brain dispositions and visual speed, user-dedicated interpretation of sentence structures, or optimized graphic progress speeds, etc. may have the present invention applied thereto in more advanced forms. The present invention will become an effective tool for optimally managing the learning direction or learning speed of users from non-English speaking countries from the first time they encounter a book in English through to their final levels of learning.

What is claimed is:

1. A dynamic English graphic playing method for enacting actual merge or piping according to Universal Grammar, the method comprising:
   inputting a sentence into a computer; and
   processing the sentence in the computer to perform steps comprising:
      making an original separate language element lighter in color or smaller in size, wherein the separate language element induces the merge enactment or the piping enactment; and
      making a space adjacent to the separate language element smaller than an original size thereof or making the space disappear, such that dynamic graphic conversion is performed by means of a merge sentence or a piping sentence that includes the separate language element and the space;
      overlapping and forming a geometric symbol denoting the merge enactment or the piping enactment in a screen display region of the separate language element.

2. The dynamic English graphic playing method of claim 1, further comprising additionally overlapping the separate language element with a sentence that has the same content as the separate language element and emerges and is accentuated or reappears and moves in a direction of the merge enactment or the piping enactment.

3. The dynamic English graphic playing method of claim 1, further comprising an executing Step, wherein
   when the execution Step is defined as Step (B),
   prior to performing Step (B), a sentence recognition Step (A) is performed, Step (A) comprising Step (A-1) of converting an input sentence into a space and a separate language element, and Step (A-2) of recognizing the converted space and separate language element, comparing the recognized space and separate language element against a data storage unit, separating the compared space and separate language element into a meaningful language element region and a space region surrounding the meaningful language element region, and storing the meaningful language element region and space region, and
   after the execution of Step B, a sentence reference position moving Step (C) is performed, Step (C) comprising Step (C-) of deleting recognition information on a preceding sentence, and stopping a dynamic graphic conversion, and Step (C-2) of moving reference points of a recognition region and a screen display region such that Step (A) is repetitively performed on a next sentence or a sentence on a next line.

4. The dynamic English graphic playing method of claim 3, wherein Step (B) comprises:
   Step (B-1) of re-categorizing sentence data derived through Step (A) into the 3 types of main sentence assembly steps according to Universal Grammar, and allocating resultant dynamic moving information to each language element region and each space region; and
   Step (B-2) of inserting predetermined symbols for the allocated dynamic moving information into original static graphic information for each region to convert into new static graphic information to be displayed on-screen, or convert the static graphic information itself for each region into new dynamic graphic information to be displayed on-screen.

5. The dynamic English graphic playing method of claim 3, further comprising converting an image represented on a computer-based display device to a file format capable of being stored in a state of storage at a certain time or in a certain represented state.

6. The dynamic English graphic playing method of claim 4, further comprising converting an image represented on a computer-based display device to a medium capable of reproducing an animating screen that is quickly or slowly and continuously converted.

7. A dynamic English graphic playing method for enacting actual moving according to Universal Grammar, the method comprising:
   inputting a sentence into a computer;
   processing the input sentence in the computer to identify a first separate language element and a second separate language element;
   from the first separate language element inducing a moving enactment, and at a predetermined position within a range between the first separate language element and the second separate language element linked to the first separate language element by the moving enactment, making the first separate language element or the second separate language element reappear; and
   forming the first separate language element or the second separate language element in a screen display region within a range between the first separate language element and the second separate language element that is linked to the first separate language element by the moving enactment, such that the formed first or second separate language element continuously moves and is displayed on a screen.

8. The dynamic English graphic playing method of claim 7, further comprising an executing Step, wherein
when the execution Step is defined as Step (B),
prior to performing Step (B), a sentence recognition Step (A) is performed, Step (A) comprising Step (A-1) of converting an input sentence into a space and a separate language element, and Step (A-2) of recognizing the converted space and separate language element, comparing the recognized space and separate language element against a data storage unit, separating the compared space and separate language element into a meaningful language element region and a space region surrounding the meaningful language element region, and storing the meaningful language element region and space region, and
after the execution of Step B, a sentence reference position moving Step (C) is performed, Step (C) comprising Step (C-1) of deleting recognition information on a preceding sentence, and stopping a dynamic graphic conversion, and Step (C-2) of moving reference points of a recognition region and a screen display region such that Step (A) is repetitively performed on a next sentence or a sentence on a next line.

9. The dynamic English graphic playing method of claim 8, wherein Step (B) comprises:
Step (B-1) of re-categorizing sentence data derived through Step (A) into the 3 types of main sentence assembly steps according to Universal Grammar, and allocating resultant dynamic moving information to each language element region and each space region; and
Step (B-2) of inserting predetermined symbols for the allocated dynamic moving information into original static graphic information for each region to convert into new static graphic information to be displayed on-screen, or convert the static graphic information itself for each region into new dynamic graphic information to be displayed on-screen.

10. The dynamic English graphic playing method of claim 8, further comprising converting an image represented on a computer-based display device to a file format capable of being stored in a state of storage at a certain time or in a certain represented state.

11. The dynamic English graphic playing method of claim 9, further comprising converting an image represented on a computer-based display device to a medium capable of reproducing an animating screen that is quickly or slowly and continuously converted.

* * * * *